United States Patent
Nilssen

[19]

[11] Patent Number: 5,111,380

[45] Date of Patent: May 5, 1992

[54] CONTROLLED SERIES-RESONANCE-LOADED INVERTER

[76] Inventor: Ole K. Nilssen, Caesar Dr., Rte. 5, Barrington, Ill. 60010

[21] Appl. No.: 498,484

[22] Filed: Mar. 23, 1990

Related U.S. Application Data

[63] Continuation of Ser. No. 286,801, Dec. 20, 1988, abandoned, and a continuation-in-part of Ser. No. 346,321, May 1, 1989, which is a continuation of Ser. No. 686,275, Dec. 26, 1984, abandoned, said Ser. No. 286,801, is a continuation-in-part of Ser. No. 80,865, Aug. 3, 1987, Pat. No. 4,819,146.

[51] Int. Cl.[5] .............................................. H02M 7/44
[52] U.S. Cl. ........................................ 363/132; 363/98
[58] Field of Search .................... 315/DIG. 7, 241 R; 363/17, 98, 131, 132, 136, 58, 56

[56] References Cited

U.S. PATENT DOCUMENTS

| | | | |
|---|---|---|---|
| 3,448,367 | 6/1969 | Corey | 363/58 |
| 4,150,424 | 4/1979 | Noechterlein | 363/26 |
| 4,162,524 | 7/1979 | Jansson | 363/56 |
| 4,502,106 | 2/1985 | Glennon | 363/56 |
| 4,525,774 | 6/1985 | Kino et al. | 363/17 |
| 4,541,041 | 9/1985 | Park et al. | 363/141 |
| 4,647,830 | 3/1987 | Bees | 315/241 R |
| 4,692,855 | 9/1987 | Kuroiwa et al. | 363/95 |
| 4,712,170 | 12/1987 | Grace | 363/98 |
| 4,727,469 | 2/1988 | Kammiller | 363/56 |
| 4,734,624 | 3/1988 | Nagase et al. | 363/17 |
| 4,757,434 | 7/1988 | Kawabata et al. | 363/41 |
| 4,763,239 | 8/1988 | Ball | 363/98 |
| 4,819,146 | 4/1989 | Nilssen | 363/98 |
| 4,855,858 | 8/1989 | Boertzel et al. | 361/18 |
| 4,887,007 | 12/1989 | Almering et al. | 315/243 |
| 4,951,186 | 8/1990 | Brakuss et al. | 363/21 |
| 4,952,849 | 8/1990 | Fellows et al. | 315/307 |

Primary Examiner—A. D. Pellinen
Assistant Examiner—Marc S. Hoff

[57] ABSTRACT

A half-bridge inverter is powered from a DC voltage source and has a series-tuned high-Q LC circuit connected across its output. A load is normally connected across the tank capacitor of the LC circuit. When a load is not so connected, the magnitude of the high-frequency current flowing through the LC circuit would tend to increase to destructively high levels. To prevent this from taking place, the high frequency current is controlled by making the inverter skip a charging-cycle each time the peak magnitude of this current exceeds a pre-determined level. In particular, during normally loaded operation, the LC circuit receives a charge from the DC voltage source for each individual half-cycle of the inverter's oscillation. However, if—during a given inverter half-cycle—the magnitude of the high frequency current exceeds a predetermined level, a control circuit acts to prevent the inverter from completing its immediately following half-cycle. As a result, with an unloaded series-tuned LC circuit connected across the inverter's output, each time the inverter acts to charge the LC circuit during a given half-cycle, the magnitude of the high frequency current increases beyond the predetermined level. Thereafter, the inverter will be prevented from re-charging the LC circuit until the magnitude of the high frequency current has decayed below the predetermined level; which will typically take about 30 cycles of free-running oscillations of the LC circuit.

36 Claims, 2 Drawing Sheets

CONTROLLED SERIES-RESONANCE-LOADED INVERTER

RELATED APPLICATIONS

Instant application is a continuation of Ser. No. 07/286,801 filed Dec. 20, 1988, now abandoned; which was a continuation-in-part of Ser. No. 07/080,865 filed Aug. 3, 1987, now U.S. Pat No. 4,819,146.

Instant application is also a continuation-in-part of Ser. No. 07/346,321 filed May 1, 1989; which is a continuation of Ser. No. 06/686,275 filed Dec. 26, 1984, now abandoned.

BACKGROUND OF THE INVENTION

1. Field of the Invention

The present invention relates to series-resonance-loaded inverters, particularly as used for powering gas discharge lamps.

2. Description of Prior Art

In an inverter where a gas discharge lamp load is parallel-connected across the tank capacitor of a high-Q LC circuit that is resonantly series-excited by a high-frequency voltage output of the inverter, it is necessary to provide some means to protect against the high currents and voltages resulting due to so-called Q-multiplication whenever the lamp load is removed or otherwise fails to constitute a proper load for the LC circuit.

In U.S. Pat. No. 4,370,600 to Zansky, circuit protection is provided by way of providing to the LC circuit an alternative load in the form of a voltage-clamping means; which voltage-clamping means acts to load the LC circuit during any period when the lamp does not constitute a proper load therefor.

The voltage-clamping is accomplished by rectifying the Q-multiplied voltage output of the LC circuit and by applying the resulting DC output to the inverter's DC power source.

However, during any period when voltage-clamping does occur, a relatively large amount of power circulates within the electronic ballast means: from the inverter's output, through the LC circuit, and back into the inverter's DC power source by way of the voltage-clamping means.

SUMMARY OF THE INVENTION

Objects of the Invention

An object of the present invention is that of providing control means in a series-resonance-loaded inverter.

This as well as other objects, features and advantages of the present invention will become apparent from the following description and claims.

Brief Description

A half-bridge inverter powered from a DC voltage source has a series-tuned high-Q LC circuit connected across its output. A lamp load is normally connected across the tank capacitor of the LC circuit. However, when a load is not so connected, the magnitude of the high-frequency current flowing through the LC circuit would tend to increase to destructively high levels. To prevent this from taking place, the 30 kHz high frequency current is controlled by making the inverter skip a charging-cycle each time the peak magnitude of this 30 kHz current exceeds a pre-determined level.

In particular, during normally loaded operation, the LC circuit receives a charge from the DC voltage source for each individual half-cycle of the inverter's oscillation. However, if—during a given inverter half-cycle—the magnitude of the high frequency current were to exceed a predetermined level, a control circuit would act to prevent the inverter from completing its immediately following half-cycle. As a result, with an unloaded series-tuned LC circuit connected across the inverter's output, each time the inverter acts to charge the LC circuit during a given half-cycle, the magnitude of the high frequency current increases: eventually beyond the predetermined level. After that point, the inverter will be prevented from re-charging the LC circuit until the magnitude of the high frequency current has decayed below the predetermined level; which decay will be exponential and will typically take 10-30 cycles of free-running oscillations of the high-Q LC circuit.

When the LC circuit is free-running, its current flows back and forth to the DC voltage source by way of one of the inverter's two switching transistors.

DESCRIPTION OF THE PREFERRED EMBODIMENT

Details of Construction

FIG. 1 schematically illustrates the electrical circuit arrangement of the preferred embodiment of the present invention.

Figure 1A:
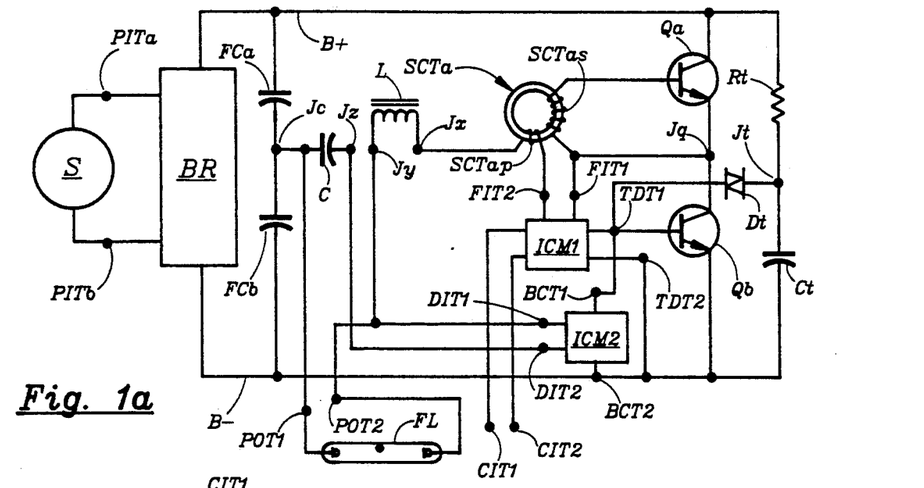
FIG. 1 provides a basic electrical circuit diagram of the preferred embodiment of the invention.

In FIG. 1a, a source S of ordinary 120 Volt/60 Hz power line voltage is applied to power input terminals PITa and PITb; which terminals, in turn, are connected with a bridge rectifier BR. The DC output from bridge rectifier BR is applied to a B+ bus and a B− bus, with the B+ bus being of positive polarity.

A first filter capacitor FCa is connected between the B+ bus and a junction Jc; and a second filter capacitor FCb is connected between junction Jc and the B− bus.

A first switching transistor Qa is connected with its collector to the B+ bus and with its emitter to a junction Jq; a second switching transistor Qb is connected with its collector to junction Jq and with its emitter to the B− bus.

A saturable current transformer SCTa has a secondary winding SCT as connected between base and emitter of transistor Qa.

Figure 1B:
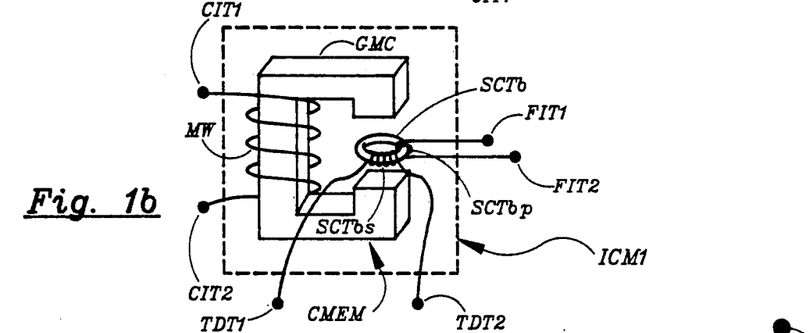

A first inverter control means ICM1, which is illustrated in detail in FIG. 1b, has a pair of transistor drive terminals TDT1 and TDT2, a pair of control input terminals CIT1 and CIT2, and a pair of feedback input terminals FIT1 and FIT2.

Terminal TDT1 is connected with the base of transistor Qb; terminal TDT2 is connected with the B− bus; terminal FIT1 is connected with junction Jq; and terminal FIT2 is connected with a junction Jx by way of primary winding SCTap of saturable current transformer SCTa.

Figure 1C:
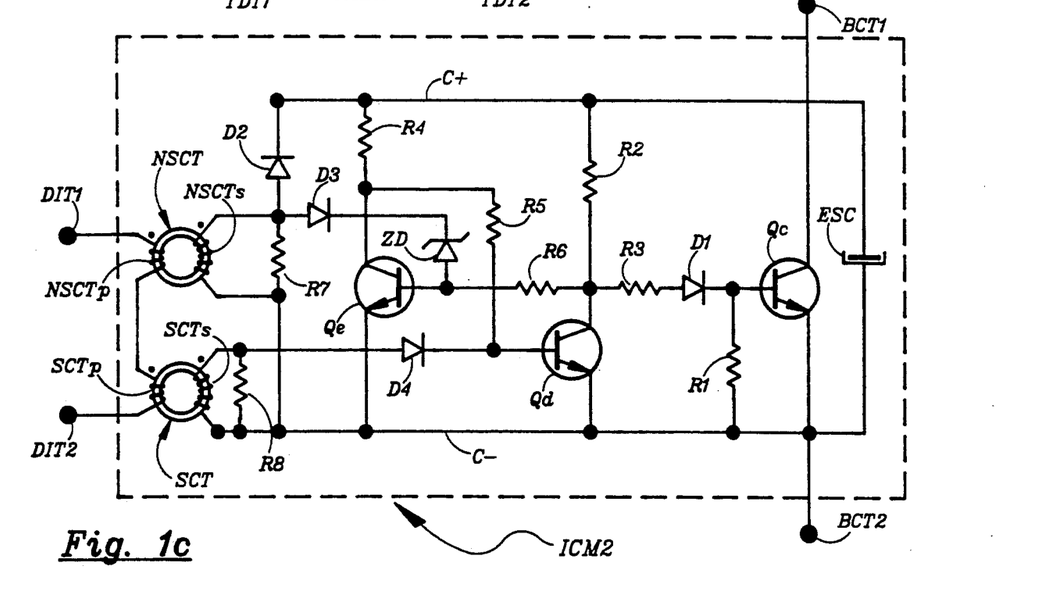

A second inverter control means ICM2, which is illustrated in detail in FIG. 1c, has a pair of base control terminals BC 1 and BC 2, a pair of drive input terminals DIT1 and DIT2.

Terminal BCT1 is connected with the base of transistor Qb; terminal BCT2 is connected with the B− bus; terminal DIT1 is connected with a junction Jy; and terminal DIT2 is connected with a junction Jz.

A tank inductor L is connected between junctions Jx and Jy; and a tank capacitor C is connected between junctions Jz and Jc. Power output terminals POT1 and POT2 are connected, respectively, with junctions Jc and Jy. A fluorescent lamp FL is connected between power output terminals POT1 and POT2.

A resistor Rt is connected between the B+ bus and a junction Jt; a capacitor Ct is connected between junction Jt and the B− bus; and a Diac Dt is connected between junction Jt and the base of transistor Qb.

In FIG. 1b, a saturable current transformer SCTb is positioned in the gap of gapped magnetic core GMC, which is part of a cross-magnetizing electro-magnet CMEM. A magnetizing winding MW wound around core GMC is connected between terminals CIT1 and CIT2. A primary winding SCTbp of saturable current transformer SCTb is connected between terminals FIT1 and FIT2; and a secondary winding SCTbs of saturable current transformer SCTb is connected between terminals TDT1 and TDT2.

In FIG. 1c, a control transistor Qc is connected with its collector to terminal BCT1 and with its emitter to terminal BCT2; which is also connected with a C− bus. A resistor R1 is connected between the base and emitter of transistor Qc; and a diode D1 is connected with its cathode to the base of transistor Qc. An energy-storing capacitor ESC is connected between the B− bus and a B+ bus.

A transistor Qd is connected with its emitter to the C− bus. The collector of transistor Qd is connected to the C+ bus by way of a resistor R2. A resistor R3 is connected between the collector of transistor Qd and the anode of diode D1.

A transistor Qe is connected with its emitter to the C− bus. The collector of transistor Qe is connected with the C+ bus by way of a resistor R4. A resistor R5 is connected between the collector of transistor Qe and the base of transistor Qd; and a resistor R6 is connected between the collector of transistor Qd and the base of transistor Qe.

A non-saturable current transformer NSCT has a primary winding NSCTp and a secondary winding NSCTs. A saturable current transformer SCT has a primary winding SCTp and a secondary winding SCTs.

Primary windings NSCTp and SCTp are series-connected between terminals DIT1 and DIT2.

Secondary winding NSCTs is connected between the C− bus and the anode of a diode D2. The cathode or diode D2 is connected with the C+ bus. A diode D3 is connected with its anode to the anode of diode D2 and with its cathode to the cathode of a Zener diode ZD. The anode of Zener diode ZD is connected with the base of transistor Qe. A resistor R7 is connected across secondary winding NSCTs.

Secondary winding SCTs is connected between the C− bus and the anode of a diode D4, whose cathode is connected with the base of transistor Qd. A resistor R8 is connected across secondary winding SCTs.

Details of Operation

Except for effects associated with cross-magnetizing the ferrite core of saturable current transformer SCTb, the operation of the half-bridge inverter of FIG. 1 is conventional and is explained in conjunction with FIG. 8 of U.S. Pat. No. Re. 31,758 to Nilssen. That is, when not cross-magnetized, saturable current transformer SCTb is of characteristics identical to those of saturable current transformer SCTa.

For a given magnitude of the DC supply voltage, due to the effect of the high-Q LC circuit, the magnitude of the current provided to the fluorescent lamp load (or to any other load presented to the output) is a sensitive function of the waveshape of the inverter's output voltage; which output voltage is a squarewave voltage of controllable symmetry and with peak-to-peak magnitude about equal to that of the instantaneous magnitude of the DC voltage present between the B− bus and the B+ bus.

The symmetry of the inverter's squarewave output voltage is a sensitive function of the symmetry of the saturation characteristics of saturable current transformers SCTa and SCTb. In particular, the duration of the ON-time of each switching transistor is determined by the saturation characteristics of its associated saturable current transformer.

By cross-magnetizing the ferrite core of saturable current transformer SCTb, its saturation characteristics are significantly affected, thereby significantly affecting the duration of the ON-time of transistor Qb. That is, the higher the degree of cross-magnetization of SCTb, the lower the saturation flux density of its ferrite core, and the shorter the resulting ON-time of transistor Qb.

The fundamental frequency of the inverter's output voltage is essentially determined by the duration of the ON-time of the transistor that has the longest ON-time. Thus, for the circuit arrangement of FIG. 1, as long as the saturation flux of the ferrite core of saturable current transformer SCTa remains unaffected, the inverter's oscillation frequency stays approximately constant even as the saturation flux of the ferrite core of saturable current transformer SCTb is reduced. As an overall result, as the duration of the ON-time of transistor Qb is reduced, the fundamental frequency as well as the peak-to-peak magnitude of the inverter's squarewave output voltage remain approximately constant, but the symmetry of this squarewave output voltage is modified such as to reduce the magnitude of the fundamental frequency component thereof.

In fact, by sufficiently cross-magnetizing the ferrite core of saturable current transformer SCTb, the duration of the ON-time of transistor Qb may be reduced to near zero (and even actually to zero), thereby resulting in a dramatic reduction of the magnitude of the fundamental frequency component of the inverter's squarewave output voltage.

Figure 2:
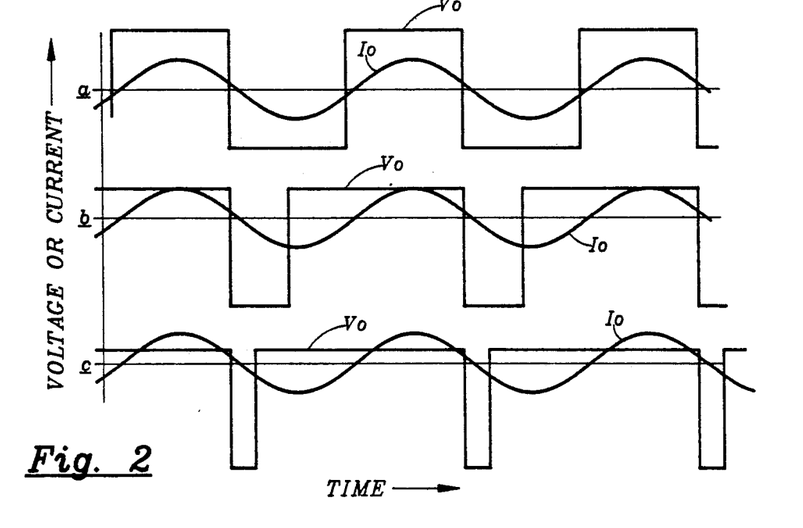
FIG. 2 illustrates waveshapes of various high frequency voltages and currents present within the circuit during different modes of operation where the inverter is not controlled such as to skip cycles.

The situation is illustrated by FIG. 2, which shows the waveforms of the inverter's output voltage Vo (i.e., the voltage provided between junctions Jc and Jx; i.e., across the LC series-circuit) and the inverter's output current Io (i.e., the current flowing through the LC series-circuit). FIG. 2a depicts the waveforms under a condition when no cross-magnetization is applied to saturable current transformer SCTb; FIG. 2b depicts the waveforms under a condition when an intermediate degree of cross-magnetization is applied to saturable current transformer SCTb; and FIG. 2c depicts the waveforms under a condition when a relatively high degree of cross-magnetization is applied to saturable current transformer SCTb. (With still a higher degree of cross-magnetization applied to saturable current transformer SCTb, the inverter simply ceases to oscillate.)

Thus, with respect to the circuit arrangement of FIG. 1 and in view of the waveforms of FIG. 2. the action of inverter control means ICM1 is such that: i) the higher the magnitude of any (unidirectional) control current provided to terminals CIT1 and CIT2 of inverter control means ICM1, ii) the more cross-magnetization there be of the ferrite magnetic core of saturable current transformer SCTb, iii) the more reduction there be in the saturation flux density of this current transformers' ferrite magnetic core, iv) the shorter be the duration of the ON-time of transistor Qb, v) the lower be the magnitude of the fundamental frequency component of the inverter's output voltage, and vi) due to the frequency-discrimination characteristics of the tuned LC output circuit, the lower be the magnitude of the current provided to the load.

Figure 3:
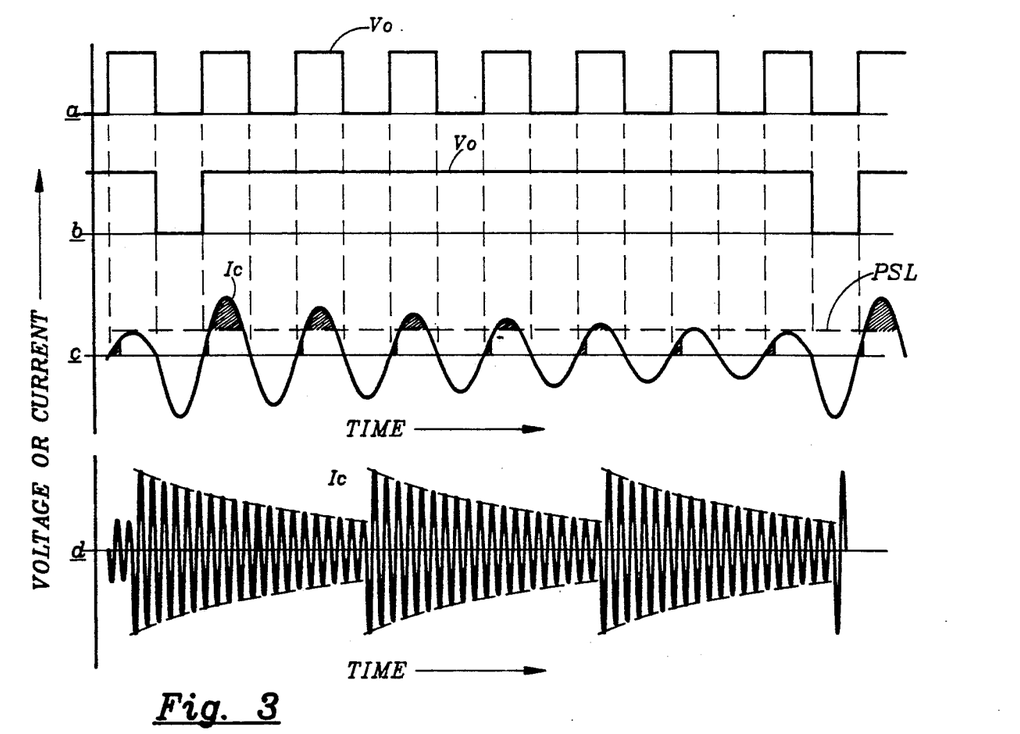
FIG. 3 illustrates waveshapes of various high frequency voltages and currents present within the circuit during a mode of operation where the inverter is indeed controlled such as to skip cycles.

Now, for purposes of explaining the operation of inverter control means ICM2, it is assumed that no cross-magnetization is applied to saturable current transformer SCTb while at the same time having the fluorescent lamp non-connected. Under this condition of no loading on the LC circuit and maximum magnitude of the fundamental frequency component of the inverter's output squarewave voltage, the waveforms and magnitudes of various resulting voltages and currents are illustrated by FIG. 3.

FIG. 3a, which is for time-reference purposes only, depicts the inverter output voltage Vo as it is observed at junction Jx—with reference to the B− bus—when the inverter oscillates without being affected by either inverter control means ICM1 or inverter control means ICM2.

FIG. 3b depicts the inverter output voltage Vo under a condition where the inverter is affected by inverter control means ICM2, but not by inverter control means ICM1. More particularly, the waveform of FIG. 3a indicates that the inverter is barred from operation—by way of preventing transistor Qb from operation—by inverter control means ICM2, except for a single cycle from time to time.

FIG. 3c depicts the current Ic flowing through tank capacitor C under the condition depicted in FIG. 3b.

FIG. 3d depicts the waveform of FIG. 3c but with a different time scale.

The current of FIG. 3c, by flowing through the primary windings of transformer SCT, affects inverter control means ICM2 such as to set the flip-flop represented by transistors Qd and Qe (thereby to cause transistor Qc to become conductive and therefore to prevent transistor Qb from switching into its ON-state) each time the positive magnitude of the current exceeds a pre-set limit (identified as PSL in FIG. 3c); which pre-set limit is mainly established by Zener diode ZD. Thus, each time after the positive magnitude of the current flowing through the LC series-circuit has exceeded this pre-set limit, transistor Qb is prevented from switching into its ON-state; which, in turn, means that no additional energy will be applied to the tuned LC series-circuit after the magnitude of the current flowing through its has exceeded this pre-set level.

The current of FIG. 3c, by also flowing through the primary winding of saturable current transformer SCT, acts to re-set the flip-flop at the very beginning of each positive half-cycle of current Ic; which re-set—by way of saturable current transformer SCT and its output to the base of transistor Qd via diode D4—is accomplished before the positive magnitude of the current has had a chance to exceed the pre-set limit.

Thus, at the beginning of each positive half-cycle, the flip-flop is re-set, thereby making transistor Qc non-conductive and transistor Qb ready to enter its ON-state. Then, except if the magnitude of the current during this positive half-cycle were to exceed the pre-set limit, transistor Qb would enter its ON-state during the next-following negative half-cycle.

In FIG. 3c, the area of each positive half-cycle that exceeds the pre-set magnitude limit is cross-hatched. Similarly, the initial part of each positive half-cycle, during which the re-setting of the flip-flop occurs, is cross-hatched.

As an overall result, the inverter of FIG. 1 operates in the following manner.

Absent cross-magnetization of the ferrite core of saturable current transformer SCTb, current flowing through the LC circuit will act to provide base drive for both switching transistors (Qa/Qb); and, as a result of positive feedback, an inverter squarewave output voltage like that depicted in FIG. 3a will be generated. Without fluorescent lamp FL connected at the inverter's output, after but a few initial cycles, the magnitude of the positive current flowing through the LC circuit will grow to a point exceeding the pre-set limit; whereafter the base drive for transistor Qb will be shunted away by transistor Qc, thereby rendering transistor Qb inoperable by preventing it from entering its ON-state. Even without transistor Qb in operation, however, the energy stored in the LC circuit will keep on oscillating: the current flowing back and forth through transistor Qa and capacitor FCa. However, since there are losses associated with this oscillation, the magnitude of the oscillating current will gradually decrease (see FIG. 3c): eventually to a point where the magnitude of the positive half-cycle will fail to exceed the pre-set limit, thereby not preventing transistor Qb from entering its ON-state when its next opportunity arrives; which next opportunity arrives with the immediately following negative half-cycle.

Thus, during this immediately following negative half-cycle, transistor Qb does enter its ON-state—as indicated in FIG. 3b —and the LC circuit thereby receives a charge of energy, thereby causing the magnitude of that negative half-cycle to increase (rather than decrease); whereafter the magnitude of the next following positive half-cycle will be large enough to exceed the pre-set limit; etc.

FIG. 3d shows the waveform of the resulting amplitude-modulated current Ic. Since the inverter frequency remains approximately constant, the magnitude of Ic (the current flowing through the tank capacitor) is proportional to the magnitude of the voltage present across the tank capacitor; which means that the waveform of FIG. 3d also represents the waveform of the output voltage provided between terminals POT1 and POT2.

Additional Comments a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

b) The instantaneous peak-to-peak magnitude of the more-or-less squarewave output voltage provided by the half-bridge inverter between junctions Jq and Jc is substantially equal to the instantaneous magnitude of the DC supply voltage.

c) Current transformers SCTa, SCTb, NSCT and SCT require only a miniscule amount of voltage across their primary windings. Hence, the magnitude of the voltage-drops between junctions Jq & Jx and between junctions Jy & Jz are substantially negligible, and the inverter's full output voltage is therefore effectively provided across the LC circuit, which consists of tank capacitor C and tank inductor L.

d) The circuit arrangement of FIG. 1 provides for two separate and substantially independent means for controlling the effective magnitude of the inverter's more-or-less squarewave output voltage.

As indicated in FIG. 2, inverter control means ICM1 provides for gradual control of the symmetry of the inverter's more-or-less squarewave output voltage, thereby providing corresponding control of the magnitude of the fundamental frequency component of this output voltage; which, in turn, provides for gradual control of the power provided to the tuned LC circuit and therefore to the load connected therewith by way of terminals POT1 and POT2. In case of a lamp load, by controlling the magnitude of current provided to terminals CIT1 and CIT2 of inverter control means ICM1, effective control of light output is attained. However, in the absence of a load on the LC circuit, it is difficult to control the effective magnitude of the inverter's output voltage to a point low enough to avoid the development of excessive currents though the LC circuit: it is simply too difficult with currently available bipolar switching transistors to make the duration of the ON-time associated with transistor Qb as low as then required.

As indicated in FIG. 3, inverter control means ICM2 provides for automatic control operative to prevent the development of excessive currents through the LC circuit.

Thus, in effect, control means ICM1 is operative to control the amount of charge provided to the LC circuit per charging cycle; whereas control means ICM2 is operative to control the repetition rate of the charging cycles.

e) Controlling the inverter's output by way of controlling the symmetry of its squarewave output voltage has an advantage compared with controlling its output by way of controlling the inverter's frequency.

The inverter's frequency can be controlled by cross-magnetizing the ferrite cores of both saturable current transformers. However, as frequency increases, the resulting output current will become more-and-more out of phase with the inverter's output voltage; which implies that each transistor will switch at a point where the magnitude of the forward-flowing current is relatively large; which, in turn, leads to high switching losses.

On the other hand, by cross-magnetizing only one of the ferrite cores, transistor switching occurs at a more favorable point—particularly in the situation of minimum power output.

f) With reference to FIG. 3d, one full charging cycle causes the magnitude of Ic to increase by a substantial amount; whereafter a relatively large number of free oscillations occur before the magnitude falls below the pre-set limit and a new charging cycle is initiated. As a result, the amplitude modulations on the Ic current—and thereby on the output voltage—get to be relatively large.

By providing only a partial charge per charging cycle—such as would result by providing an amount of control current to terminals CIT1 and CIT2 of control means ICM1—the increase in the magnitude of Ic resulting from a single charging cycle would be reduced; and, as a result, the degree of amplitude modulation would be correspondingly reduced.

g) As may be noticed in FIG. 2, transistor Qa ceases to conduct in its forward direction while current is still flowing in the forward direction. After transistor Qa has ceased to conduct, the forward-flowing current will continue to flow for a brief period. However, instead of flowing through capacitor FCa and the B+ bus, it will now flow through capacitor FCb and the B− bus, through the secondary winding of saturable current transformer SCTb, and through the base-collector junction of transistor Qb.

h) In some situations it may be advantageous to place a commutating rectifier in parallel with each switching transistor, especially with transistor Qb. In particular, a commutating rectifier may be connected with its anode to the emitter and with its cathode to the collector of each of transistors Qa and Qb.

i) The waveform of FIG. 3b is idealistic. In reality, with most commonly available components, the waveform will have very narrow negative-going spikes occurring between each major negative-going pulse—with one such narrow spike occurring just prior to each time the current waveform of FIG. 3c crosses the zero-line from positive to negative.

j) Forward conduction of a transistor is defined as current flowing, with the aid of forward base drive current, directly between the collector and the emitter; which, in case of transistor Qa for, instance, means that forward current is defined as positive current flowing from its collector to its emitter while positive drive current is being provided to its base.

k) It is noted that fluorescent lamp FL could have been connected between junctions Jc and Jz instead of between junctions Jc and Jy.

l) In inverter control means ICM2, saturable current transformer SCT may be eliminated by using a so-called one-shot instead of the indicated ordinary flip-flop. That is, the flip-flop may be so arranged as to automatically reset itself after a pre-determined period of time (ex: about 30 micro-seconds) instead of using the pulse from saturable current transformer SCT to effect such resetting.

m) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   an energized LC circuit means oscillating at a natural resonance frequency, an alternating current flow in the LC circuit means;
   a means for loading the LC circuit means being connected with the LC circuit means; the alternating current having a continuous sinusoidal waveshape irrespective of the degree of loading of the LC circuit means;

a source of DC voltage;
inverter means connected in a circuit with the DC voltage and the LC circuit means, the inverter means having control input means and being operative, each time in response to receiving a control input at the control input means, to provide an energy pulse to the LC circuit means, thereby increasing the magnitude of the alternating current; and
sensing means connected in circuit with the LC circuit means and the control input means, the sensing means being operative to provide said control input, but only whenever the magnitude of the alternating current falls below a pre-determined level.

2. The arrangement of claim 1 wherein: i) the LC circuit comprises a series-combination of a tank capacitor and a tank inductor, and ii) the inverter means comprises a pair of output terminals, and iii) the series-combination is effectively connected across the output terminals.

3. The arrangement of claim 1 wherein the frequency of the alternating current is on the order of 30 kHz.

4. An arrangement comprising:
source means operative, in response to receiving a control input at a control input means, to provide an energy pulse at an output;
LC circuit means connected with the output, an alternating current flowing in the LC circuit means;
a means for loading the LC circuit means being connected with the LC circuit means; the alternating current having a continuous sinusoidal waveshape irrespective of the degree of loading of the LC circuit means; and
sensing means connected in circuit with the LC circuit means and the control input means, the sensing means being operative to provide said control input each time the magnitude of the alternating current falls below a pre-determined level.

5. The arrangement of claim 4 wherein: i) the alternating current has positive half-cycles of current and negative half-cycles of current, ii) said control input is provided each time after the magnitude of a positive half-cycle of current fails to exceed a pre-determined level.

6. The arrangement of claim 5 wherein said control input is operative to cause said energy pulse to be provided during the negative half-cycle of current.

7. The arrangement of claim 4 combined with means operative to permit control of the magnitude of the energy pulse.

8. An arrangement comprising:
a source of DC voltage;
inverter means connected with the DC voltage and operative to provide voltage pulses at an inverter output, the voltage pulses each having a duration, the inverter means having control means operative to control the timing of the points in time at which these voltage pulses occur;
LC circuit means connected with the inverter output and operative to establish an oscillation at a natural frequency in response to the voltage pulses, the oscillation being represented by an alternating current having positive half-cycles and negative half-cycles, the duration of each half-cycle being no longer than the duration of one of the voltage pulses; and
feedback means connected in circuit with the LC circuit means and the control means, the feedback means being operative to cause a voltage pulse to occur during each of some, but not all, of the negative half-cycles.

9. The arrangement of claim 8 wherein the feedback means is responsive to the magnitude of the alternating current and operative to cause a voltage pulse to occur during each negative half-cycle that immediately follows a positive half-cycle during which the magnitude of the alternating current failed to exceed a pre-determined level.

10. The arrangement of claim 9 combined with means to permit control of the duration of the voltage pulses.

11. An arrangement comprising:
source of DC voltage;
inverter means connected with the DC voltage and operative to provide voltage pulses at an inverter output; and
a resonant series-combination of a capacitor and an inductor effectively connected across the inverter output, an alternating voltage developing across the capacitor in response to the voltage pulses, the frequency of this alternating voltage being higher than the repetition rate of the voltage pulses, the alternating voltage being amplitude-modulated in synchronism with the voltage pulses.

12. A combination comprising:
a source operative, each time on receipt of a control action at a control input, to provide a voltage pulse at an output, the voltage pulse having a pulse duration;
series-resonant LC circuit connected across the output and operative to absorb energy from each voltage pulse, thereby to establish resonant oscillations manifested by an alternating current flowing in the LC circuit, the alternating current having positive half-cycles and negative half-cycles, the pulse duration being no longer than the duration of one of these half-cycles; and
control means connected with the LC circuit and the control input, the control means being operative repeatedly to provide the control action, thereby to provide repeated voltage pulses, there being a period of time between each voltage pulse provided, the duration of this period of time being longer than the duration of one complete cycle of the alternating current.

13. The combination of claim 12 wherein the duration of the period of time may be expressed as a whole multiple of the duration of one complete cycle of the alternating current.

14. The combination of claim 12 wherein the control means is operative, each time the magnitude of the alternating current during one of the positive half-cycles fails to exceed a predetermined level, to cause the provision of a control action such as to cause the provision of a voltage pulse during the immediately following half-cycle.

15. A combination comprising:
a source of DC voltage;
LC circuit means having a natural resonance frequency; and
inverter means connected in circuit between the DC voltage and the LC circuit means, the inverter means: i) being operative to provide power to the LC circuit means such as to establish an alternating current therein, the alternating current having positive half-cycles and negative half-cycles, and ii) having a first and a second transistor means, the first transistor means being operative to conduct in its forward direction during part of each of said positive half-cycles, the second transistor means being operative to conduct in its forward direction during part of some, but not all, of said negative half-cycles.

16. The combination of claim 15 wherein the inverter means has control input means operable, on receipt of a control input, to prevent the second transistor means from conducting in its forward direction during part of any one of said negative half-cycles.

17. A combination comprising:
source of DC voltage;
inverter means connected with the DC voltage and operative to provide an alternating output voltage at an inverter output, the alternating output voltage having a fundamental frequency; and
a combination of a capacitor means and an inductor means connected in circuit with the inverter output, the combination having a natural resonance frequency equal to a whole multiple of said fundamental frequency; whereby the combination is excited at a sub-harmonic of its natural resonance frequency.

18. The combination of claim 17 wherein the inverter means comprises control means operative to control said fundamental frequency in such manner as to control said whole multiple.

19. The combination of claim 17 wherein said capacitor means and said inductor means are effectively connected in series across the inverter output.

20. The combination of claim 17 wherein: (i) an alternating current is flowing from the inverter output; and (ii) the frequency of this alternating current is equal to a whole multiple of said fundamental frequency.

21. An arrangement comprising:
a source providing a power line voltage at a set of power line terminals; and
frequency-converting means connected with the power line terminals and operative to provide at a converter output a high-frequency voltage; the frequency-converting means having control circuit operative to cause: (i) as long as the converter output is unloaded or only loaded below a certain level, the high-frequency voltage to have a magnitude that varies periodically in an approximately exponential manner between a lower level and a higher level; and (ii) as long as converter output is loaded above said certain level, the high-frequency voltage to have a magnitude that is substantially non-varying.

22. The arrangement of claim 21 wherein, when the converter output is indeed loaded above said certain level, the magnitude of the high-frequency voltage does not exceed said lower level.

23. The arrangement of claim 22 wherein the converter output is loaded above said certain level by way of a non-linear impedance means, such as a gas discharge lamp.

24. An arrangement comprising:
a source providing a DC voltage at a set of DC terminals;
inverter means connected with the DC terminals and operative to provide at an inverter output a rectangular-wave voltage characterized by having a fundamental voltage component as well as plural harmonic voltage components; the fundamental voltage component having a fundamental frequency; the harmonic voltage components having harmonic frequencies; the inverter means having control means being operative, in response to symmetry of the rectangular-wave voltage, thereby correspondingly to control the magnitude of the fundamental voltage component; and
load means connected with the inverter output by way of tuned LC circuit means; the amount of power received by the load means being a function of the magnitude of said fundamental voltage component; such that the amount of power provided to the load means may be adjusted, via the control means, by way of adjusting the symmetry of the inverter's rectangular-wave output voltage.

25. An arrangement comprising:
a source providing a power line voltage at a set of power line terminals; and
frequency-converting means connected with the power line terminals and operative to provide at a converter output a high-frequency voltage; the frequency-converting means having a control circuit operative to: (i) as long as the converter output is supplying power below a certain level, to cause the high-frequency voltage to have a magnitude that varies periodically between a minimum level and a maximum level; and (ii) as long as the converter output is supplying power above said certain level, to cause the high-frequency voltage to have a magnitude that is substantially non-varying.

26. The arrangement of claim 25 where, as long as the converter output is indeed supplying power below said certain level, the high-frequency voltage is being amplitude-modulated at a fundamental frequency that is different from the fundamental frequency of the power line voltage by more than a factor of two.

27. An arrangement comprising:
a source providing a DC voltage at a pair of DC terminals;
tuned LC circuit having a pair of LC input terminals and a pair of LC output terminals; the tuned LC circuit, after having been energized, being operative to oscillate at its natural resonance frequency, thereby to provide an AC voltage at the LC output terminals; this AC voltage having a fundamental frequency equal to said natural resonance frequency;
inverter means connected with the DC voltage terminals and operative to provide a rectangular-wave inverter output voltage at a pair of inverter output terminals; the inverter output terminals being connected in circuit with the LC input terminals; the inverter means having control means operative, in response to receiving a control action at a control input, to vary the fundamental frequency of the rectangular-wave inverter output voltage such as to always maintain this fundamental frequency equal to the fundamental frequency of the AC voltage or to a subharmonic frequency thereof; and
means connected in circuit with the control input and operative, in response to the magnitude of the AC voltage, to provide said control action, thereby to control the magnitude of the AC voltage.

28. An arrangement comprising:
a source providing a DC voltage at a pair of DC terminals;
tuned LC circuit having a pair of LC input terminals and a pair of LC output terminals; the tuned LC circuit, when energized, being operative to oscillate at an LC tuned circuit frequency, thereby to provide an AC voltage at the LC output terminals;

inverter means connected with the DC voltage terminals and operative to provide a rectangular-wave inverter output voltage at a pair of inverter output terminals; the inverter output terminals being connected in circuit with the LC input terminals; the inverter means having control means operative, in response to receiving a control action at a control input, to vary the symmetry of the rectangular-wave inverter output voltage; and means connected in circuit with the control input and operative to provide said control action, thereby to control the magnitude of the AC voltage by way of controlling the symmetry of the rectangular-wave inverter output voltage.

29. An arrangement comprising:

a source providing a DC voltage at a pair of DC terminals;

inverter means connected with the DC terminals and operative to provide a rectangular-wave inverter output voltage at a pair of inverter output terminals; the rectangular-wave inverter output voltage consisting of a unidirectional voltage component as well as of plural alternating voltage components; each of the plural alternating voltage components having a magnitude; the inverter means having control means operative, in response to receiving a control action at a control input, to control of the symmetry of the rectangular-wave inverter output voltage, thereby to control of the magnitudes of the plural alternating voltage components;

load means connected with the inverter output terminals; the load means being responsive only to the alternating voltage components of the rectangular-wave inverter output voltage; and action means connected with the control input and operative to provide said control action, thereby to control the symmetry of the rectangular-wave inverter output voltage, thus to control the amount of power supplied to the load means.

30. The arrangement of claim 29 wherein: (i) the rectangular-wave inverter output voltage has a fundamental frequency; and (ii) the load means includes an LC tuned circuit having a natural resonance frequency that is approximately equal to this fundamental frequency.

31. The arrangement of claim 29 wherein: (i) the rectangular-wave inverter output voltage has a fundamental frequency as well as harmonic frequencies; and (ii) the load means includes an LC tuned circuit having a natural resonance frequency that is approximately equal to one of the harmonic frequencies.

32. The arrangement of claim 29 wherein: (i) the rectangular-wave inverter output voltage has a fundamental frequency; (ii) one of the plural alternating voltage components has a frequency equal to this fundamental frequency; and (iii) the load means includes an LC circuit tuned to resonance at or near this fundamental frequency.

33. The arrangement of claim 29 wherein the inverter means includes a first and a second inverter switching transistor; these transistors being series-connected across the DC terminals.

34. The arrangement of claim 29 wherein the inverter means includes a first and a second switching transistor means; the first transistor switching means being periodically and alternatingly conductive and non-conductive; the second transistor switching means being periodically and alternatingly conductive and non-conductive; the first transistor switching means being conductive only during periods when the second transistor switching means is non-conductive; the second transistor switching means being conductive only during periods when the first transistor switching means is non-conductive; and first transistor means conducting current intermittently and peridically, each time for a period having a first duration; the second transistor means conducting current intermittently and peridically, each time for a period having a second duration; the inverter's control means being operative to control the extent of the first duration as compared with the extent of the second duration.

35. An arrangement comprising:

a source providing a power line voltage at a set of power line terminals; and frequency-converting means connected with the power line terminals and operative to provide at a converter output a high-frequency voltage characterized by: (i) being of a frequency substantially higher than that of the power line voltage; (ii) as long as the converter output is supplying power below a certain rate, having a magnitude that varies periodically between a maximum level and a minimum level, the maximum level being of a magnitude equal to about twice that of the minimum level; and (iii) as long as the converter output is supplying power above a certain higher rate, having a magnitude that is substantially constant.

36. The arrangement of claim 35 wherein, as long as the converter output is indeed supplying power below said certain rate, the magnitude of the high-frequency voltage varies between said maximum and minimum levels in a substantially exponential manner.

* * * * *

UNITED STATES PATENT AND TRADEMARK OFFICE
CERTIFICATE OF CORRECTION

PATENT NO. : 5,111,380

DATED : May 5, 1992

INVENTOR(S) : Ole K. Nilssen

It is certified that error appears in the above-identified patent and that said Letters Patent is hereby corrected as shown below:

In col. 11, lines 59-68, to col. 12, lines 1-14, Claim 24 is incorrect as printed, the correct claim 24 is as shown below.

24. An arrangement comprising:
    a source providing a DC voltage at a set of DC terminals;
    inverter means connected with the DC terminals and operative to provide at an inverter output a rectangular-wave voltage characterized by having a fundamental voltage component as well as plural harmonic voltage components; the fundamental voltage component having a fundamental frequency; the harmonic voltage components having harmonic frequencies; the inverter means having control means being operative, in response to receiving a control action at a control input, to control the symmetry of the rectangular-wave voltage, thereby correspondingly to control the magnitude of the fundamental voltage component; and

UNITED STATES PATENT AND TRADEMARK OFFICE
CERTIFICATE OF CORRECTION

PATENT NO. : 5,111,380
DATED : May 5, 1992
INVENTOR(S) : Ole K. Nilssen

It is certified that error appears in the above-indentified patent and that said Letters Patent is hereby corrected as shown below:

```
        load means connected with the inverter output by way of tuned
LC circuit means; the amount of power received by the load means being
a function of the magnitude of said fundamental voltage component; such
that the amount of power provided to the load means may be adjusted, via
the control means, by way of adjusting the symmetry of the inverter's
rectangular-wave output voltage.
```

Signed and Sealed this

Twentieth Day of July, 1993

Attest:

MICHAEL K. KIRK

*Attesting Officer*      *Acting Commissioner of Patents and Trademarks*